United States Patent
MacIver et al.

(10) Patent No.: US 7,783,278 B2
(45) Date of Patent: Aug. 24, 2010

(54) INSTALLATION OF A PERSONAL EMERGENCY RESPONSE SYSTEM

(75) Inventors: William G. MacIver, Hyde Park, MA (US); Alan D. Brav, Middleton, MA (US); Joshua A. Hanson, Newton, MA (US); William S. Prenovitz, Lexington, MA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 1003 days.

(21) Appl. No.: 11/376,035

(22) Filed: Mar. 15, 2006

(65) Prior Publication Data
US 2007/0218866 A1  Sep. 20, 2007

(51) Int. Cl.
*H04M 11/04* (2006.01)
(52) U.S. Cl. .............. 455/404.1; 455/423; 455/425; 379/33; 379/37; 379/51; 713/202
(58) Field of Classification Search .......... 455/404.1, 455/423, 425; 379/33, 37–51; 713/202
See application file for complete search history.

(56) References Cited

U.S. PATENT DOCUMENTS

| 5,003,294 A | 3/1991 | Mason et al. ............... 340/574 |
| 6,980,105 B2 | 12/2005 | Hodgen .................. 340/539.11 |
| 2002/0066041 A1* | 5/2002 | Lemke ....................... 713/202 |
| 2003/0055649 A1* | 3/2003 | Xu et al. ..................... 704/270 |
| 2004/0145465 A1 | 7/2004 | Stults et al. ................ 340/521 |
| 2004/0215750 A1 | 10/2004 | Stilp .......................... 709/220 |
| 2005/0101314 A1 | 5/2005 | Levi .......................... 455/423 |
| 2005/0201397 A1 | 9/2005 | Petite ........................ 370/401 |
| 2005/0231375 A1 | 10/2005 | Kingston .................. 340/574 |
| 2005/0250440 A1 | 11/2005 | Zhou et al. ................ 455/12.1 |
| 2007/0105528 A1* | 5/2007 | Haas et al. ............... 455/404.1 |

FOREIGN PATENT DOCUMENTS

WO  WO 00/22586  4/2000
WO  WO 00/55825  9/2000

OTHER PUBLICATIONS

CarePartner® 6700 Communicator User and Installation Guide, Lifeline Systems, Inc., Jun. 2004.

* cited by examiner

*Primary Examiner*—Patrick N Edouard
*Assistant Examiner*—Justin Y Lee

(57) ABSTRACT

A communicator for a personal emergency response system determines, when a power switch is switched on, whether the communicator has previously successfully performed at least one predetermined installation sequence. If the communicator has previously completed the installation sequence, it bypasses the installation sequence. If the communicator has not previously completed the installation sequence, it prompts the user through the installation sequence using a series of audible or text prompts. During the installation sequence, the user is prompted to perform range testing to verify the operation of a transmitter in conjunction with the communicator in the personal emergency alarm system in one or more locations.

33 Claims, 12 Drawing Sheets

INSTALLATION OF A PERSONAL EMERGENCY RESPONSE SYSTEM

BACKGROUND OF THE INVENTION

The present invention relates to Personal Emergency Response Systems (PERS) and more specifically to a method and apparatus for automatically prompting a user to perform a series of setup operations during an initial setup procedure and denoting a change of mode upon satisfactory completion of the setup procedure.

Personal Emergency Response Systems are widely used by the elderly or infirm to allow an individual to summon assistance if such as needed. Typically, a PERS includes a Personal help button (PHB) and a communicator. The PHB includes an RF transmitter or an infra-red transmitter that transmits a signal to the communicator in response to the activation of the personal help button by the user that requires assistance. The communicator receives the signal transmitted by the PHB and initiates a telephone call to a call-center. Upon connection of the call from the communicator to the call-center, the communicator enables a speakerphone in the communicator so that an operator at the call-center can speak with the user requiring assistance assuming the user is able to communicate. The communicator also conveys data identifying the subscriber to the call-center. If the user indicates that assistance is required or if a call to the call-center is initiated and the user is unable to speak, or unable to be heard, assistance may be summoned by the operator at the call-center.

Such systems can be of great aid to the elderly or infirm and can avoid unfortunate situations in which an individual is in need of assistance and is unable to summon help. However, as is readily apparent, in order for a PERS to function, it must be properly installed. While the installation of such units is straightforward, many PERS units are installed by volunteers, personnel with limited training or personnel with limited technical knowledge. For this reason, it would be desirable to have a simple and reliable method for installing the PERS system and verifying that the unit is properly installed after the unit is delivered to the user. Moreover, it would be desirable for the installation of the PERS communicator to be properly installed by an elderly individual with limited technical expertise since such individuals represent the great majority of PERS users.

BRIEF SUMMARY OF THE INVENTION

In accordance with the present invention an improved PERS system and method of installation of such a system is disclosed. The PERS system includes a communicator and a personal help button (PHB). In response to activation of the PHB, the communicator initiates a call to a call center in normal operation.

A method and apparatus are presently disclosed to assist the user in the installation of the PERS communicator upon delivery of the unit. More specifically, the PERS communicator includes a NON-INSTALLED state and an INSTALLED state. The communicator may be in only one of the two states at any given time. An indicator that reflects the present state of the communicator is stored in a non-volatile memory which may comprise a volatile memory with a battery-backup to assure that the indicator is retained or, alternatively, the memory may be non-volatile memory so that it retains data even in the absence of applied power. For purposes of the present discussion both embodiments are considered non-volatile memory.

When a user receives the communicator, the communicator is set to the NON-INSTALLED state. When the power switch is set to ON, the communicator automatically prompts the subscriber to perform a series of predetermined actions via a voice synthesizer or a visual display. Once the subscriber performs the specified actions and the communicator is capable of establishing a telephone connection with the call-center, the communicator is set to the INSTALLED state.

If the communicator is powered off once it has assumed the INSTALLED state, it will retain that state when it is once again powered up and will not repeat the installation sequence. If the communicator does not complete the setup sequence, it will remain in the NON-INSTALLED state. If the communicator is powered down before it has assumed the INSTALLED state, when the communicator is powered up, it will repeat the setup sequence. The communicator will continue to prompt the user through the setup sequence each time the unit is powered on until the setup sequence is properly completed. Thereafter, when the communicator is powered up, it will bypass the setup sequence. In the foregoing manner, persons with minimal technical familiarity or expertise are prompted through the setup of the communicator to assure that the device can communicate with the call-center.

As one element of the installation sequence, the subscriber is prompted to perform range testing to verify that the signal transmitted by the PHB can be received by the communicator from various locations where the user is likely to be located. The subscriber is afforded the opportunity to perform range tests from such locations to verify that the transmitted signal will be received by the communicator.

A reset bar or illuminable switch is located on the communicator and the subscriber is prompted to press the reset bar when he/she is ready to continue with the installation during the setup process. To direct the attention of the subscriber to the reset bar, a visual indicator is disposed physically in the reset bar. The visual indicator may comprise a light emitting diode (LED), a bulb, a light pipe illuminated by any suitable light source or any other suitable visual indicator. In one embodiment, the visual indicator blinks to further direct the attention of the user to the reset bar that he/she is being requested to press.

Other features, aspects and advantages of the disclosed method and apparatus will be apparent to those of ordinary skill in the art from the Detailed Description of the Invention that follows.

BRIEF DESCRIPTION OF THE SEVERAL VIEWS OF THE DRAWINGS

The invention will be more fully understood from the detailed description of the invention that follows in conjunction with the drawings of which:

FIG. 1b is a more detailed block diagram of the communicator of FIG. 1a;

FIG. 2 is a flow diagram depicting the use of the non-installed and installed modes in the installation of the communicator of FIG. 1a; and FIGS. 3a-3j are a detailed flow diagram depicting the method of installation and range testing employed in the communicator of FIG. 1a.

DETAILED DESCRIPTION OF THE INVENTION

In accordance with the present invention, an improved PERS is disclosed that prompts a user to perform a set of predetermined actions. The communicator has first and second states that are designated as a NON-INSTALLED state and an INSTALLED state. The communicator stores in a non-volatile memory an indicator of the state of the device.

The communicator is delivered to the user or subscriber in the NON-INSTALLED state. When the subscriber turns on the power switch, a software program executing on a processor determines whether the communicator is in the NON-INSTALLED state or the INSTALLED state. If the communicator is in the NON-INSTALLED state, the processor executes a series of instructions that prompt the subscriber to perform certain actions to setup the communicator. After the subscriber has performed the actions necessary to achieve the proper installation of the communicator, the communicator assumes the INSTALLED state and the indicator in the non-volatile memory is updated to reflect the INSTALLED state of the communicator.

If the subscriber does not complete the sequence of steps that are necessary to install the communicator, the communicator does not enter the INSTALLED state and the next time power is turned off and turned on, the communicator will again test the current state, determine that the state indicator in memory is in the NON-INSTALLED state, and prompt the subscriber to perform the installation of the communicator.

If the subscriber does complete the sequence of steps that are necessary to install the communicator, the communicator assumes the INSTALLED state and the next time power is turned off and turned on, the communicator will again test the current state, determine that the state indicator in memory is in the INSTALLED state, and skip the installation sequence.

During the installation sequence, the communicator prompts the subscriber to perform range testing to verify the operation of the PHB over a range of locations.

Figure 1A:
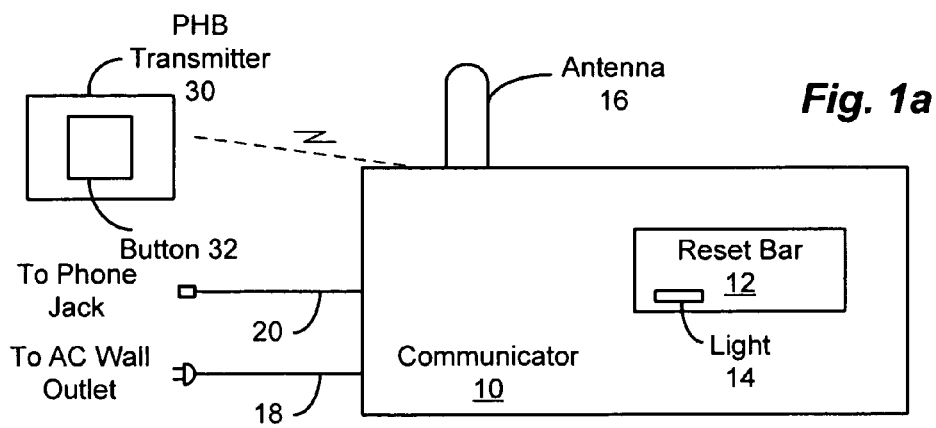
FIG. 1a is a block diagram of a PERS system having a communicator and a personal help button that is operative in accordance with the present invention.

FIG. 1a is high level block diagram of a PERS system operative in accordance with the present invention. Referring to FIG. 1a, the PERS includes a communicator 10 and a personal help button (PHB) transmitter 30. The PHB transmitter includes a button 32 that, when activated causes a signal to be transmitted. Based upon the design of the particular PERS, the signal transmitted may be an RF signal or an infrared signal. The communicator 10 includes a reset bar 12. The reset bar 12 actuates a switch that is coupled to a processor within the communicator. The subscriber is prompted to press the reset bar 12 to provide certain indications to the processor as will be subsequently discussed in greater detail. A visual indicator or light 14 is integrated into the reset bar and at specified times the light is turned on or caused to blink to signal to the subscriber that the reset bar should be pressed.

The communicator 10 includes an AC power cord 18 for connection to an AC wall outlet (not shown) and a phone cord 20 for connection to a phone jack (not shown). The communicator 10 also includes interface circuits that allow the communicator 10 to initiate a call to a call center upon receipt of a signal transmitted by the PHB transmitter 30. The communicator 10 further includes a speakerphone (see FIG. 2) that is enabled to permit voice communication between an operator at the call center and the subscriber upon connection of a telephone call between the communicator 10 and the call center. The communicator 10 includes an antenna 16 for receiving RF signals from the PHB transmitter 30 when the mode of wireless communication between the PHB and the communicator involves RF transmission.

Figure 1B:
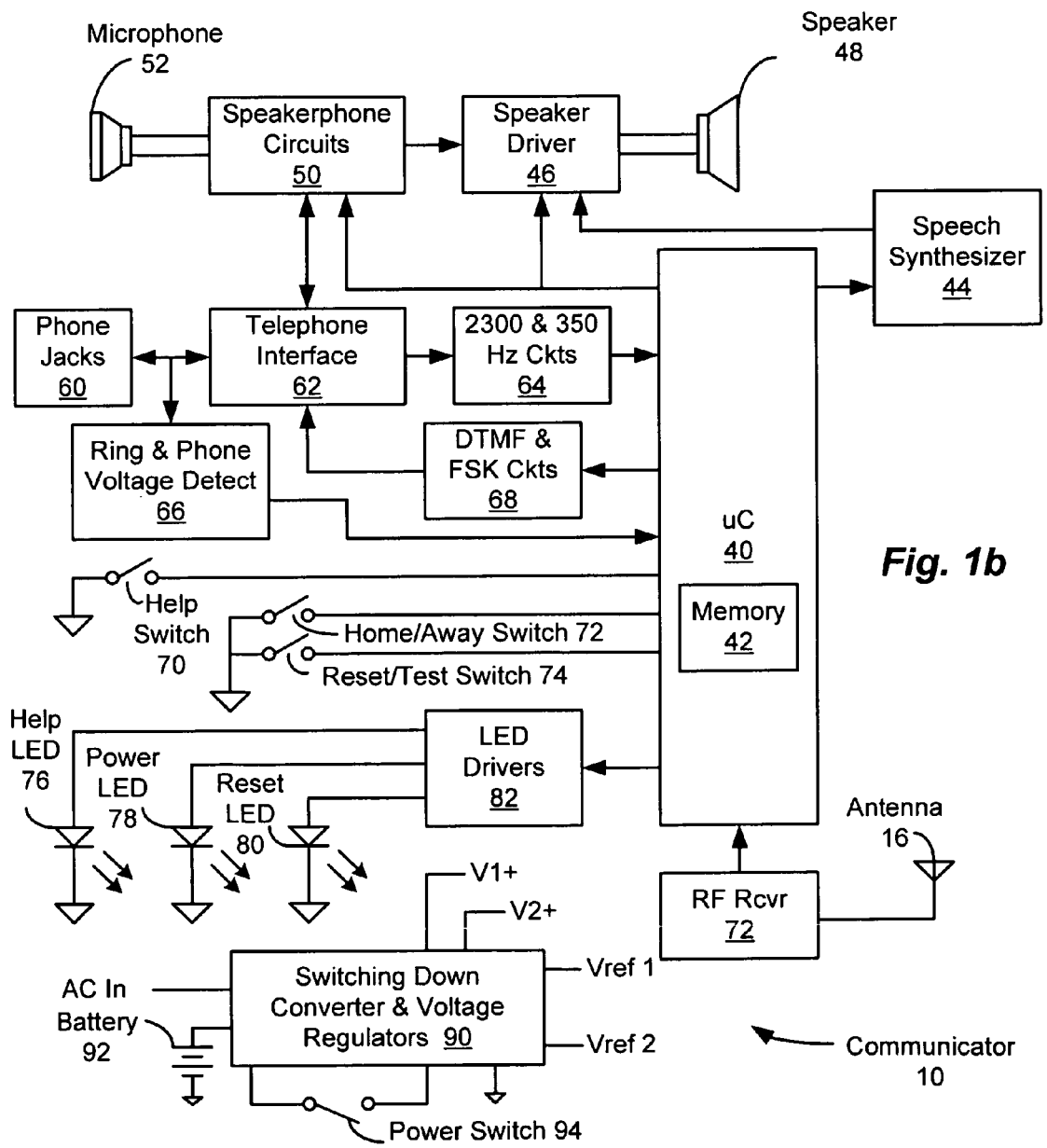

FIG. 1b is a block diagram of the communicator 10 of FIG. 1a. Referring to FIG. 1b, the communicator 10 includes a microcontroller 40 that includes memory 42. The microcontroller 40 is operative to execute a software program out of the memory 42 to perform the functions subsequently described in greater detail. While the presently described system employs a microcontroller with onboard memory, such as the MC68HC908LK24 microcontroller produced by freescale semiconductor of Austin, Tex., it should be appreciated that any suitable microcontroller or a microprocessor and read only memory (ROM) or non-volatile random access memory may be employed to store code executed by the microcontroller or microprocessor, as applicable, and the state indicator.

The microcontroller 40 is coupled to a speech synthesizer 44 which is operative to produce predefined audio prompts under the control of the microcontroller 40. The output of the speech synthesizer 44 is coupled to a speaker driver or amplifier 46 which in turn is coupled to a speaker 48.

Phone jacks 60 are coupled to telephone interface circuits 62 and ring and voltage detect circuits 66. The ring and voltage detect circuit circuits 66 are coupled to the microcontroller 40 and allow the microcontroller 40 to determine when the communicator 10 is coupled to the wall phone jack and to detect an incoming call to the subscriber.

The communicator 10 further includes Dual Tone Multi-Frequency (DTMF) and Frequency Shift Keying (FSK) circuits 68 that generate DTMF tones and FSK data streams that are coupled to the telephone interface circuits 62. The DTMF circuits generate DTMF tones under the control of the microcontroller 40 to permit the dialing of the call center in response to receipt of a signal from the PHB transmitter 30 (FIG. 1a). The FSK circuits convert data from the microcontroller into FSK format for transmission to the call center. More specifically, the FSK data may contain an alarm type, subscriber number for identification of the source of the call at the call center or any other suitable information.

The telephone interface 62 is further coupled to 2300 Hz and 350 Hz detection circuits that in turn are coupled to the microcontroller 40. The 2300 Hz and 350 Hz detection circuits provide indications of the receipt of such tones to the microcontroller 40 which are employed by the microcontroller in handshaking and kiss off operations as is known in the art.

The telephone interface circuit 62 is further coupled to speakerphone circuits 50 which in turn are coupled to the speaker driver 46 to permit voice communication from a call center operator to be heard by a subscriber within hearing range of the communicator 10. Additionally, a microphone 52 is coupled to the speakerphone circuits 50 which in turn are coupled to the telephone interface circuits 62. Thus, when a call is connected between the communicator 10 and the call center, the operator at the call center can hear a subscriber within a reasonable range of the communicator even if the subscriber is immobile or unable to approach the communicator 10.

The communicator further includes a help switch 70, an optional home/away switch 72, and a reset bar/test switch 74. Activation of the help switch 70 on the communicator 10 initiates a call to the call center. The home/away switch 72, when present, allows the subscriber to set the communicator in a first mode for operation when the subscriber is at home and in a second mode of operation that is applicable when the subscriber is away from home. The reset bar/test switch 74 is activated by the subscriber in response to prompts by the communicator 10 to provide a signal to the microcontroller 40 that the subscriber has responded. The function of the reset bar/test switch 74 with respect to the installation of the communicator 10 is subsequently discussed in greater detail.

The microcontroller 40 also is coupled to light emitting diode (LED) drivers 82 so as to permit the microcontroller 40 to turn on the Help LED 76, the Power LED 78 and the Reset LED 80. The Reset LED 80 forms the visual indicator 14 that is integrated into the reset bar 12 as shown in FIG. 1a.

The antenna 16 is coupled to an RF receiver 72 that receives RF signals transmitted by the PHB transmitter 30 (FIG. 1a) when the button 32 (FIG. 1a) is pushed by a subscriber. In the event the transmitter comprises an IR transmitter, the receiver 72 comprises an infrared receiver.

A power system designated as switching down converters and voltage regulators 90 receive AC power from a power cord coupled to a wall outlet. Additionally, a battery 92 is coupled to the power system to permit the communicator to operate without AC power during the installation process and for limited periods, such as in the event of a power failure. The power system 90 provides power outputs V1+, V2+, Vref1 and Vref2 and provides appropriate power voltages and references for the microcontroller 40 and circuits within the communicator 10. An on/off switch 94 allows the communicator 10 to be powered on and off. The V1+ rail supplies power loads such as the speaker driver and relays that do not require significant regulation. The V2+ rail is a regulated supply that is employed to power the microcontroller 40 and other logic circuitry within the communicator. The Vref1 and Vref2 are voltage references that are used by analog circuitry within the communicator 10.

The battery 92 powers the communicator 10 when AC power is not available. More specifically, when the power switch 94 is switched to the on position, the battery 92 supplies power to the microcontroller 40 and the logic circuits when the unit is not coupled to AC power. When the communicator 10 is coupled to AC power, when the power switch is switched on, the switching down converter and voltage regulator 90 generates the voltage that are coupled to the microcontroller 40 and the logic circuits within the communicator 10.

The memory 42 maintains an indication of whether the communicator 10 is in the first NON-INSTALLED state or the second INSTALLED state. Typically, the memory 42 is a non-volatile flash memory but may comprise a memory that is maintained by a battery such as battery 92. In practice, when the communicator 10 is delivered to a subscriber the memory 42 is configured such that the communicator 10 is in the NON-INSTALLED state.

Figure 2:
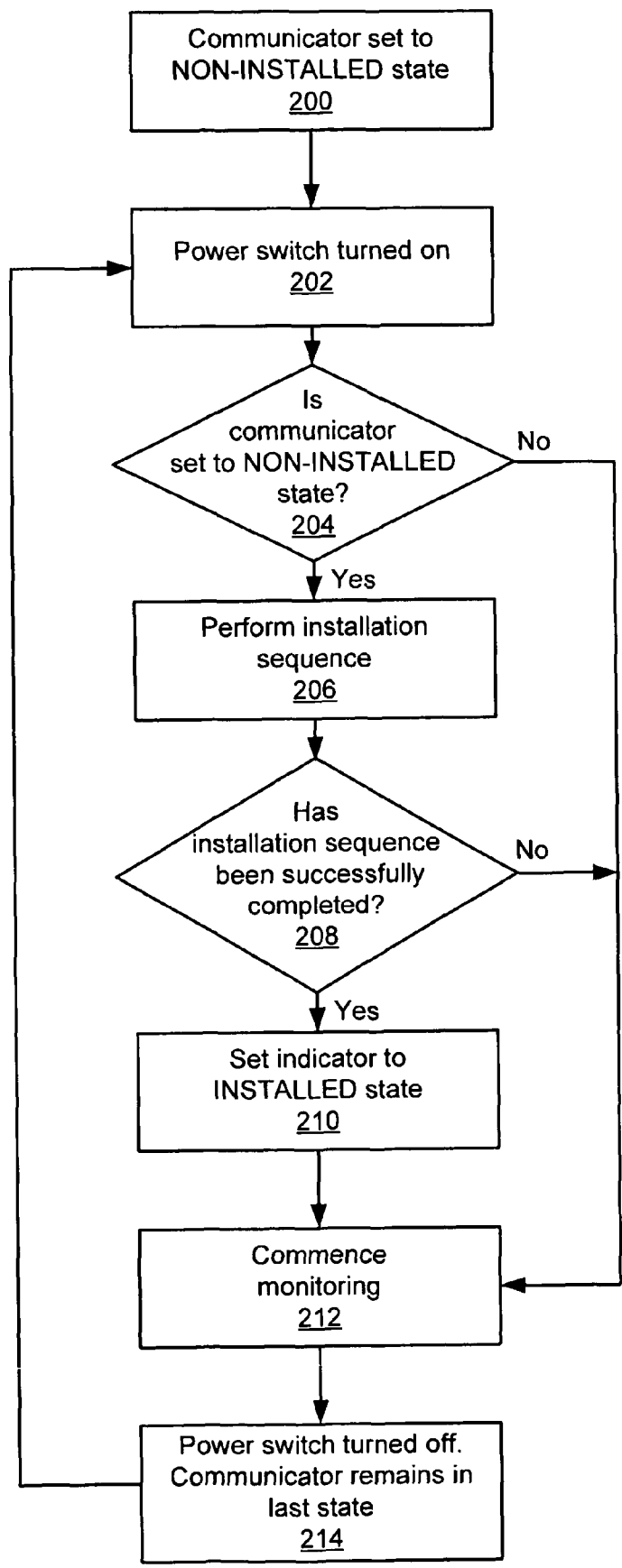

FIG. 2 depicts a flow diagram of the installation sequence of the communicator in accordance with the present invention. More specifically, referring to FIG. 2, the communicator 10 is initially set to the NON-INSTALLED state as indicated in step 200. This corresponds to the configuration of the communicator 10 in which a subscriber would receive a communicator 10 prior to installation. As indicated in step 202, the subscriber turns the power switch from off to on to apply power to the unit. If the communicator 10 has not been plugged into AC power, at this stage the communicator is powered by the battery 92 (See FIG. 2). A determination is made by the microcontroller 40 whether the communicator 10 is in the NON-INSTALLED state or the INSTALLED state by testing the state of an indicator stored in the memory 42 as depicted in step 204. The first time that a subscriber turns on the communicator 10, the communicator 10 will be configured in the NON-INSTALLED state. If the microcontroller 40 determines in step 204 that the communicator 10 is in the NON-INSTALLED state control passes to step 206. As illustrated in step 206, the microcontroller 40 proceeds to perform a setup procedure to prompt the subscriber through an installation sequence for the communicator 10. Exemplary steps that make up the setup procedure are subsequently discussed in greater detail with respect to FIGS. 3a-3j.

The setup procedure involves a number of steps and actions by the subscriber to complete the installation successfully. If the setup procedure is completed successfully, as indicated by step 208, the indicator in the memory 42 that is set to the NON-INSTALLED state is modified and the indicator is set to the INSTALLED state. The communicator 10 then commences operation as illustrated in step 212.

If for any reason, the setup procedure is not completed successfully, the indicator that is in the NON-INSTALLED state is not modified and control passes to step 214. When the communicator 10 is powered off, the indicator stored in the memory 42 retains its state. Thus, if setup procedure was not completed successfully, the state indicator remains in the NON-INSTALLED state as indicated in step 214. The next time the communicator 10 is powered on, as reflected in step 202, the microcontroller 40 will determine that the communicator 10 is still in the NON-INSTALLED state in step 204 and the communicator 10 will proceed to repeat the setup procedure as indicated in step 206.

Accordingly, the microcontroller 40 will continue to prompt the subscriber through the setup process until the setup sequence has been successfully completed. Thereafter, the communicator 10 will not attempt to prompt the subscriber through the setup sequence each time the unit is powered on after being powered off.

FIGS. 3a-3j illustrate the operation of the presently disclosed system and method in greater detail. As previously discussed, the communicator 10 has first and second states (NON-INSTALLED and INSTALLED states, respectively) that are reflected by a state indicator stored in a non-volatile memory. The communicator 10 is typically delivered to a subscriber with the communicator configured in the NON-INSTALLED state. When a subscriber is prepared to install the communicator 10, the subscriber powers on the unit by turning on the power switch 94 as is indicated in step 250 (See FIG. 3a). The microcontroller 40 next determines whether the Help button 70 was on the time the power switch 94 was switched on. If the Help button 70 is held on the time the power switch 94 is switched on, the installation sequence is bypassed or the state indicator is modified as is subsequently described.

If, as indicated in decisions that 252, the microcontroller 40 determines that the Help button 70 was not on when the power switch 94 was switched on, control passes to decision step 254. The microcontroller 40 then determines whether the communicator has been previously successfully installed by testing the state indicator. More specifically, if it is determined that the state indicator equals INSTALLED, the installation sequence is bypassed as indicated in step 256 and the communicator 10 enters a monitoring mode in which the communicator awaits the detection of an alarm condition (See FIG. 3j). The alarm condition may constitute the detection of a wireless signal from the PUB transmitter 30 (FIG. 1a) or the detection of any other alarm condition in the event other sensors, such as fire, smoke, or intrusion sensors are coupled to the communicator 10. If the microcontroller 40 determines that the communicator 10 has not previously successfully completed the installation sequence by testing the state indicator, as indicated in decision step 254, the microprocessor 40 proceeds to step 302 to initiate the installation sequence (See FIG. 3b).

Once the microcontroller 40 determines that the system needs to proceed through the installation sequence, the microcontroller 40 controls the speech synthesizer 44 to prompt the subscriber with an audible prompt that states "Welcome. We will now help you set up your communicator step by step." as indicated in step 302. In FIGS. 3a-3j, the speaker symbol on the right side of the respective step indicates an audible prompt that is generated by the speech synthesizer 44 under the control of the microcontroller 40.

Following the audible prompt in step 302, there is a pause for a brief period, such as one second, as depicted in step 304. As reflected in step 306, the subscriber is next provided within other audible prompt by the speech synthesizer 44 which states "If you miss a step, wait and the instruction will repeat." Following step 306, there is another pause as indicated in step 308. After the brief pause, as reflected in step 308, the microcontroller 40 controls the speech synthesizer 44 to issue another audible prompt to the subscriber that states "Please find your Quick Setup Guide located in the box and follow along." as illustrated in step 310. The Setup Guide is an instruction manual that provides written and pictorial setup instructions and is typically delivered to a subscriber with the communicator. Following step 310, there is another brief pause as indicated in step 312. Thereafter, microcontroller 40 controls the speech synthesizer 44 to issue a further prompt that states "When you have the Quick Setup Guide in front of you, press the blinking reset bar." as depicted in step 314. The microcontroller 40 controls the LED drivers 82 to blink the Reset LED 80 that is physically disposed in the Reset bar 12 so as to draw the attention of the subscriber to the Reset bar 12 that the subscriber has been instructed to press. When the subscriber is prepared to continue, he/she presses the Reset bar 12 to trigger the reset switch 74. The microcontroller 40 awaits the signal indicating that the Reset bar 12 has been pressed. When the microcontroller 40 determines that the Reset bar 12 has been pressed, control passes to step 320 (See FIG. 3c). If 60 seconds passes without the Reset bar 12 being pressed, such is detected as indicated in step 318 and control passes to step 314, at which point the announcement in step 314 is replayed.

While not illustrated in FIGS. 3a-3j for simplicity, if a particular prompt is played three or more times without the Reset bar 12 being pressed, the microcontroller 40 controls the speech synthesizer 44 to play an additional announcement before proceeding to play the announcement immediately preceding the decision or other step, such as decision step 316. Typically, this additional announcement states "If you need assistance, please contact the subscriber services number located in your Quick Setup Guide." Thus, in the instant case, this additional announcement would be played and control would then pass to step 314 for replaying of the announcement there indicated.

Once the Reset bar 12 has been pressed by the subscriber, control passes to step 320 and a further prompt is issued by the speech synthesizer 44 under the control the microcontroller 40. As indicated in step 320 (see FIG. 3c), the prompt states "Thank you. First, we will place your communicator in the correct spot, near both a phone jack and a power outlet. See step one in the Setup Guide." Thereafter, as indicated in step 322, the speech synthesizer 44, under the control the microcontroller 40, prompts the subscriber to "Press the blinking Reset bar when you are ready to continue." The microcontroller 40 awaits the Reset bar 12 press as depicted in decision step 324. If the Reset bar 12 is not pressed within 60 seconds, as indicated in decision step 326, control passes to step 328 and the speech synthesizer 44 issues a prompt similar to that issued in step 320 before repeating the prompt depicted in step 322.

When the microcontroller 40 detects that the Reset bar 12 has been pressed, control passes to step 330 and the speech synthesizer issues a further prompt under the control the microcontroller 40 that states "Your communicator should now be located near both a phone jack and a power outlet." This step is followed by a brief pause as indicated by step 332 followed by a further prompt that states "Now let's plug the power cord into a wall outlet. See step two in the Setup Guide." as illustrated in step 334. The microcontroller 40 is powered by the battery 92 (See FIG. 1b) prior to the connection of the AC power cord 18 to AC power. The microcontroller 40 awaits the detection of power resulting from the connection of the AC power cord 18 to an AC wall outlet as depicted at steps 340 and 342 (see FIG. 3d). If the microcontroller 40 determines that 60 seconds have passed without the connection of the communicator 10 to AC power, as illustrated in step 342, the microcontroller 40 causes the speech synthesizer 44 to issue a prompt that states "Power has not been detected." as depicted at step 344. The microcontroller 40 then continues to await the connection of the communicator 10 to AC power. Once the microcontroller 40 determines that the AC power cord 18 has been plugged in to AC wall outlet such that the switching down-converter and voltage regulators 90 are powered by AC power, the microcontroller 40 causes the speech synthesizer 44 to issue a prompt that states "Good. We detect power." as shown in step 346. Following the announcement depicted in step 346, a brief pause is provided under the control the microcontroller 40 as illustrated in step 348. Next, the microcontroller 40 controls the speech synthesizer 44 to state "Please press the blinking Reset bar to continue." as depicted in step 350. As illustrated in decision steps 352 and 354, the microcontroller 40 waits for the subscriber to press the Reset bar 12. If the Reset bar 12 is not pressed within 60 seconds, as illustrated at step 354, the announcement of step 350 is repeated.

When the microcontroller 40 detects that the Reset bar 12 has been pressed, the microcontroller 40 controls the speech synthesizer 44 to issue the prompt depicted in step 356. At this point, the system prompts the subscriber to plug the phone cord 20 into an appropriate phone jack. As indicated in step 356, the speech synthesizer 44 plays the message "Next, we will plug the gray phone cord into a phone jack in the wall. You may need to unplug your phone from the wall temporarily. See the picture in step 3."

As illustrated in decision steps 360 and 362 (see FIG. 3e), the microcontroller 40 then awaits detection of a signal from the phone voltage detect circuit 66 that indicates that the phone cord 20 has been plugged into a phone jack. If 60 seconds pass and the microcontroller has not received a phone voltage detect signal from the phone voltage detect circuit 66, the microcontroller 40 controls the speech synthesizer 44 to play a message that states "The communicator has not been correctly plugged into the phone line. See step three." as shown in step 364. After causing this message to be played, the microcontroller 40 continues to await detection of the phone voltage detect signal from the detect circuit 66. When the microcontroller 40 detects the phone voltage detect signal indicating that the phone cord 20 has been plugged into a phone jack, the microcontroller 40 controls the speech synthesizer 44 to issue a prompt to the subscriber that states "Good. Your communicator is now plugged in." as illustrated in step 366.

Once the microcontroller 40 has determined that the phone cord 20 and the AC power cord 18 have been plugged in, the communicator 10 should be capable of initiating a call to the call center.

Following the connection of the AC power cord 18 and the phone cord 20, the subscriber is provided with the opportunity to perform range testing to assure that the PHB transmitter 30 will function properly in all areas of the premises where the subscriber might find him or herself when assistance might be needed.

At the commencement of the range testing process, the microcontroller initializes a range test timer to 20 minutes and begins the countdown of the range test timer as illustrated in step 368. If the range test timer times out, the subscriber is prompted to activate the PHB transmitter 30 to initiate a call to the call center as is subsequently discussed. After initiating the countdown of the range test timer, the microcontroller 40 controls the speech synthesizer 44 to prompt the subscriber to press the Reset bar 12 to continue with the range test as illustrated in step 370.

As depicted in decision steps 372 and 374, the microcontroller 40 continues to monitor the reset switch 74 (see FIG. 1b) to determine if the Reset bar 12 to which the reset switch 74 is coupled, has been pressed. In the event 60 seconds passes without detection of the reset bar 12 being pressed, the microcontroller 40 controls the speech synthesizer 44 to replay the prompt of step 370 to suggest again that the subscriber press the blinking Reset bar 12 to continue.

As depicted in step 380 (see FIG. 3f) the microcontroller 40 next controls the speech synthesizer 44 to prompt the subscriber to plug the subscriber's phone into the back of the communicator 10 if such is necessary. This prompt is followed by a brief pause as depicted in step 382 and the subscriber is then prompted to press the blinking Reset bar to continue as depicted in step 384.

As illustrated in steps 386 and 388, the microcontroller 40 monitors the Reset switch 74 to determine whether the Reset bar 12 has been pressed. If the Reset bar 12 has not been pressed within 60 seconds of the prompt of step 384, the subscriber is again prompted to plug the subscriber's phone into the back of the communicator 10, if necessary, as illustrated in step 390 and control passes to step 384. When the microcontroller 40 determines that the subscriber has pressed the Reset bar 12, the microcontroller 40 controls the speech synthesizer 44 to issue a prompt that states "Now we will test the range of your help button in various rooms of your home. Please refer to step five in your Setup Guide." as depicted in step 392. Following a pause as depicted in step 394, the microcontroller 40 controls the speech synthesizer 44 to issue a further prompt to the subscriber to press the Reset bar 12 when the subscriber is ready to begin the range test as shown in step 400 (See FIG. 3g).

During the range test, the subscriber proceeds to various locations where he or she might need to summon assistance and presses the PHB transmitter button 32 to verify that the transmitted signal from the PHB transmitter 30 is properly received by the receiver 72 of the communicator 10. During the process of range testing, the communicator does not initiate a call to the call center each time the button 32 is pushed. Each time the PHB transmitter button 32 is pressed, if the transmitted signal is received by the communicator, a beep tone is sounded to alert the subscriber that the transmitted signal was received. If no beep tone is heard, the subscriber knows that the PHB transmitter is not functional from the location at which the transmitter was actuated.

More specifically, as depicted at steps 402 and 404, the microcontroller 40 determines when the subscriber has pressed the Reset bar 12 and is ready to proceed with the range test. If 60 seconds have passed and the Reset bar 12 has not been pressed, as depicted in decision step 404, the microcontroller 40 causes the prompt of step 400 to be replayed. When the microcontroller 40 determines that the subscriber has pressed the Reset bar 12 as depicted at step 402, the microcontroller 40 controls the speech synthesizer 44 to issue a prompt to the subscriber to begin the range test as shown in step 406.

At the beginning of the range test, the microcontroller sets a prompt timer to 60 seconds and it starts the countdown of the prompt timer as depicted in step 408. Once the prompt timer expires before a signal from the PHB transmitter 30 is detected, an audible prompt is provided to the user that indicates that the signal from the PHB transmitter was not detected as is subsequently described.

After starting the prompt timer, the microcontroller 40 sets an indicator PHB_Detected=False as shown in step 410. The PHB_Detected indicator is False prior to the time when a signal transmitted by the PHB transmitter 30 has been detected during range testing. Once a single transmitted signal has been detected during range testing, the PHB_Detected indicator is set to True.

Figure 3A:
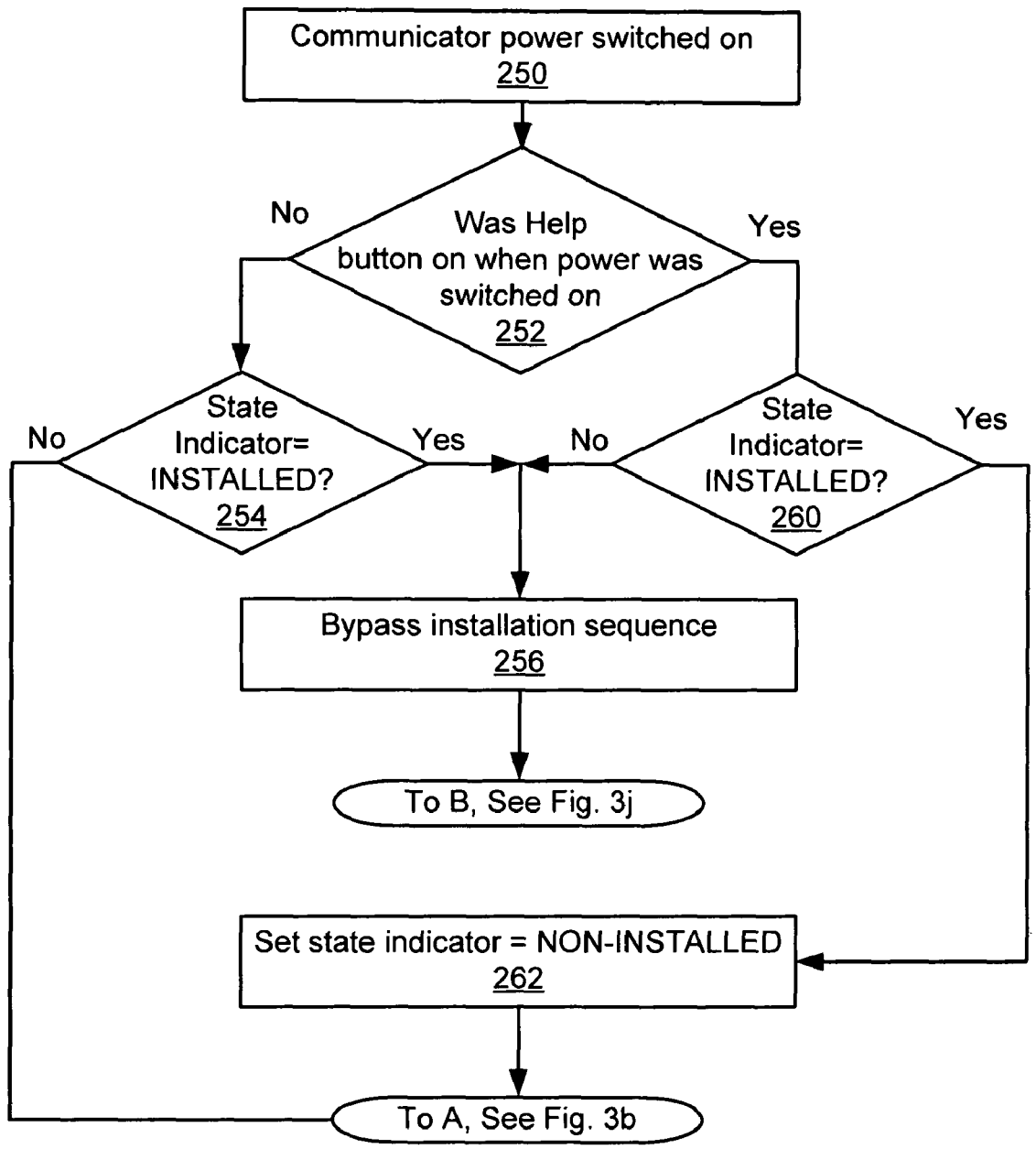
Figure 3B:
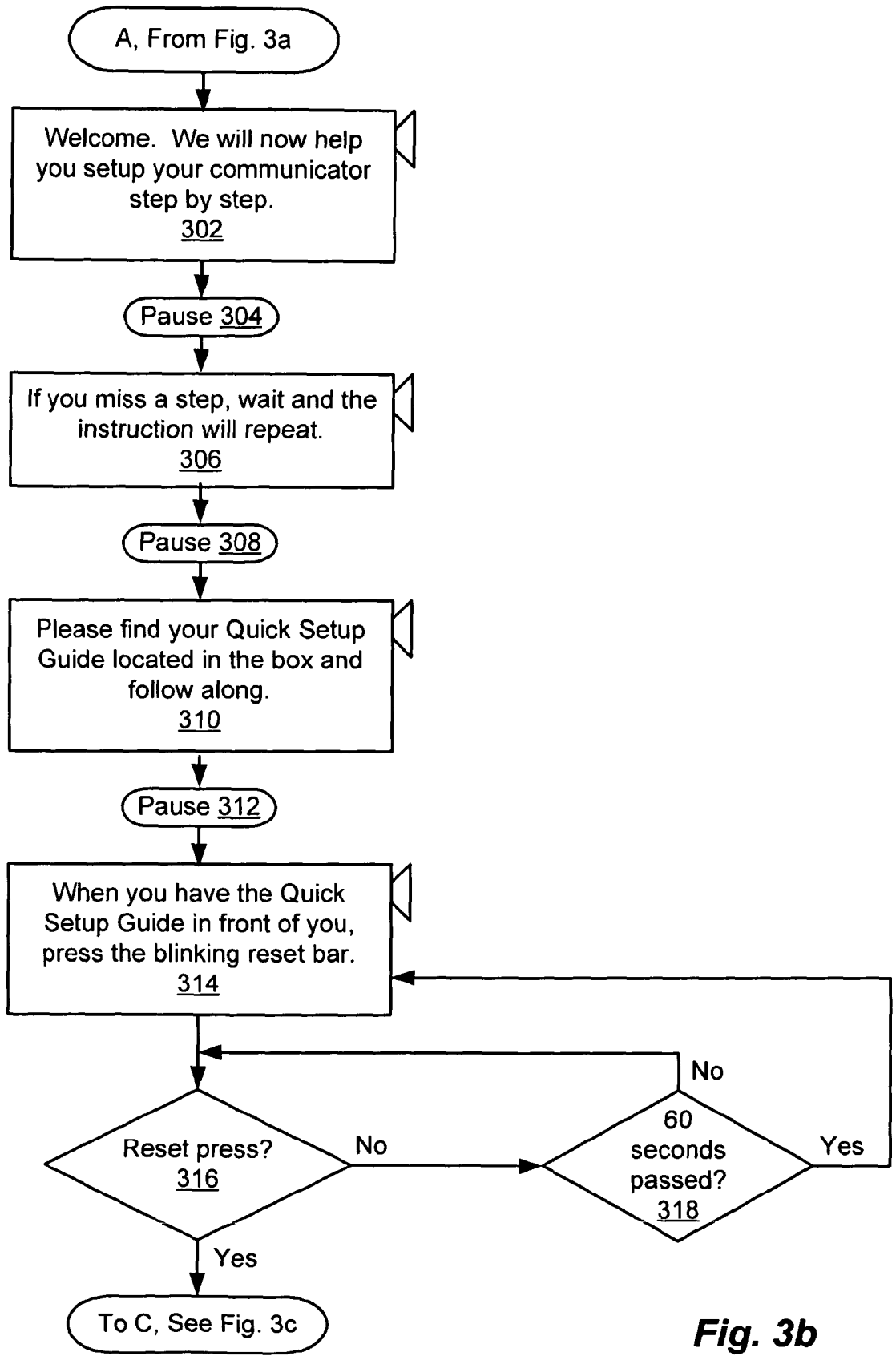
Figure 3C:
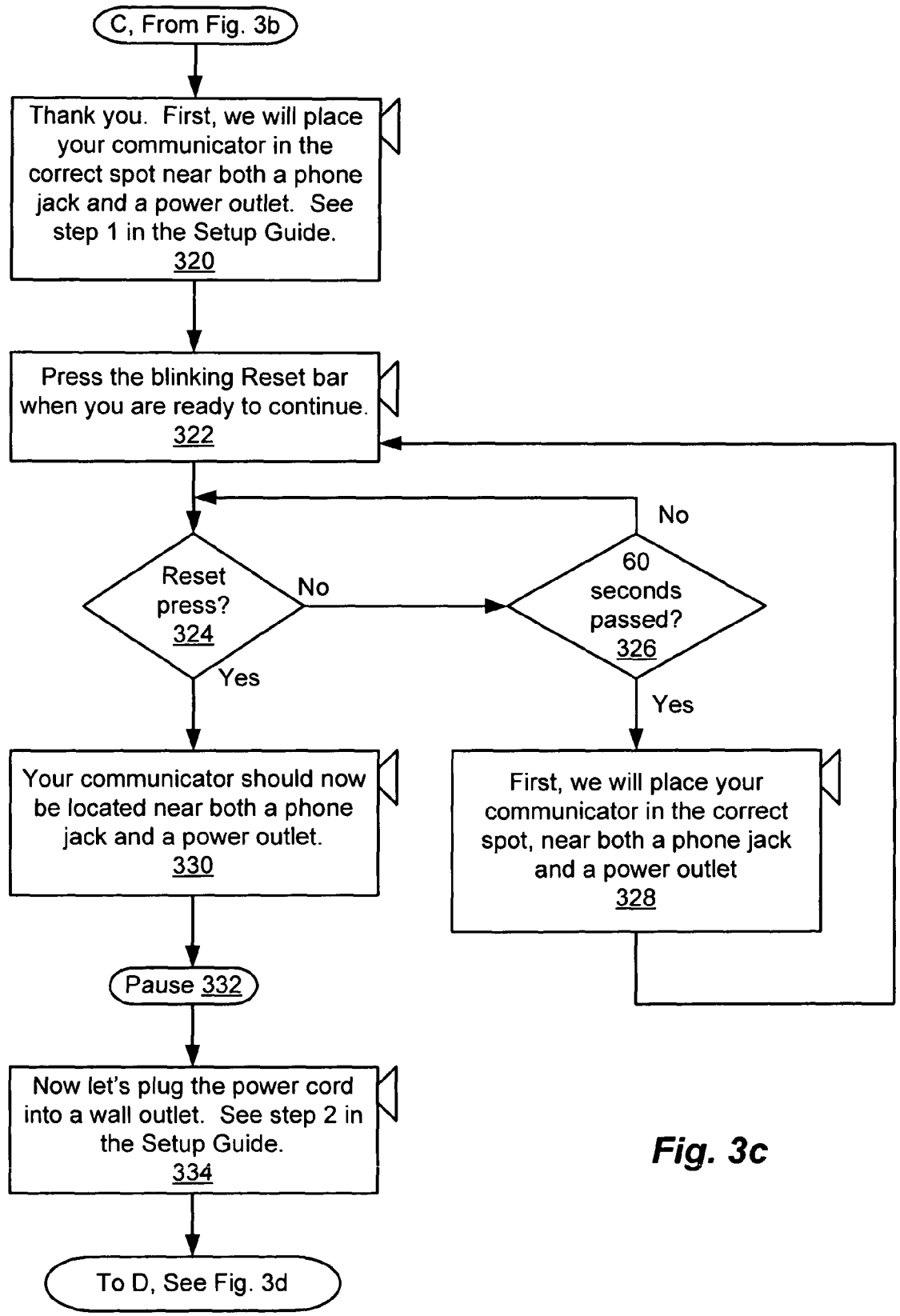
Figure 3D:
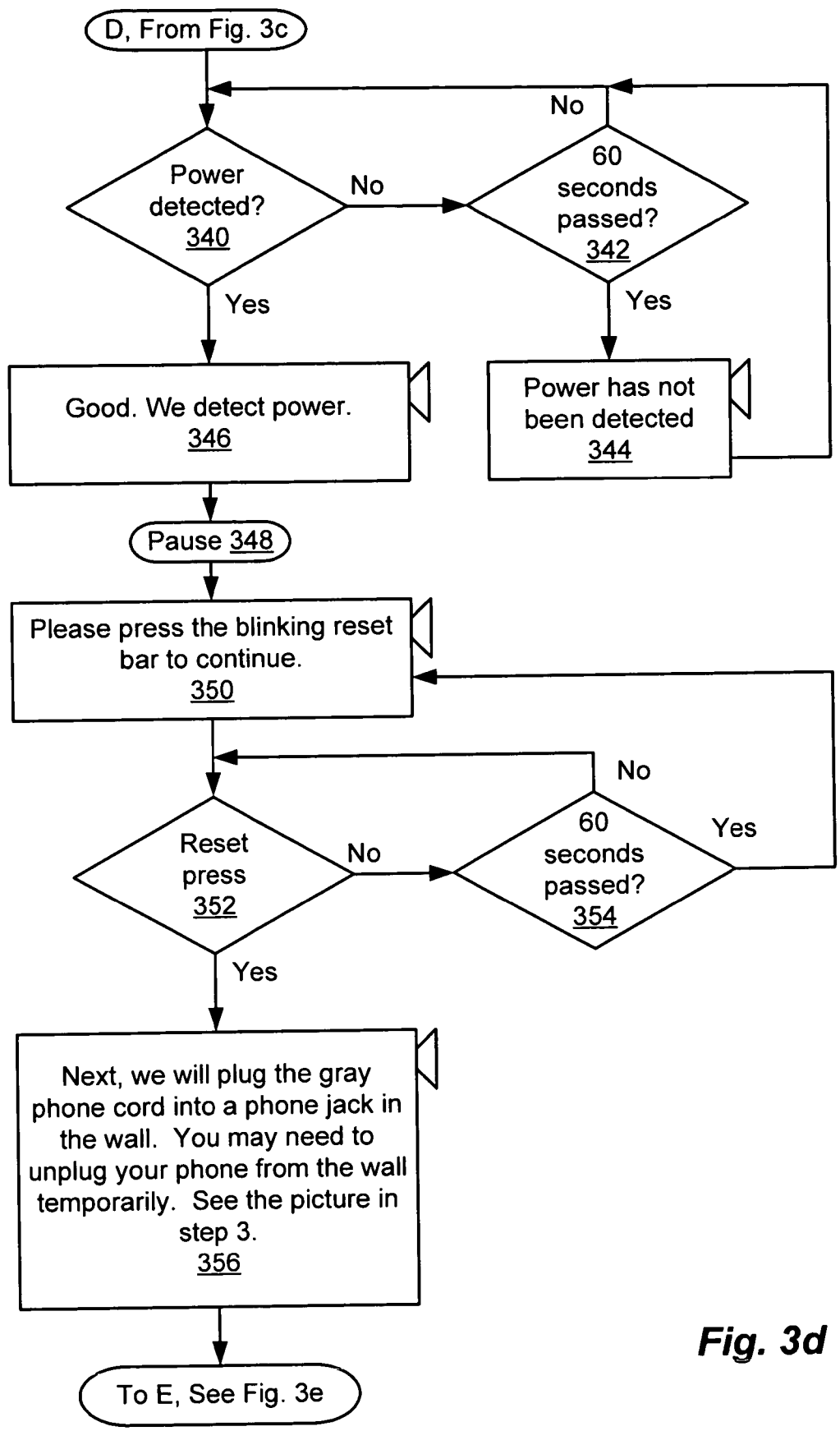
Figure 3E:
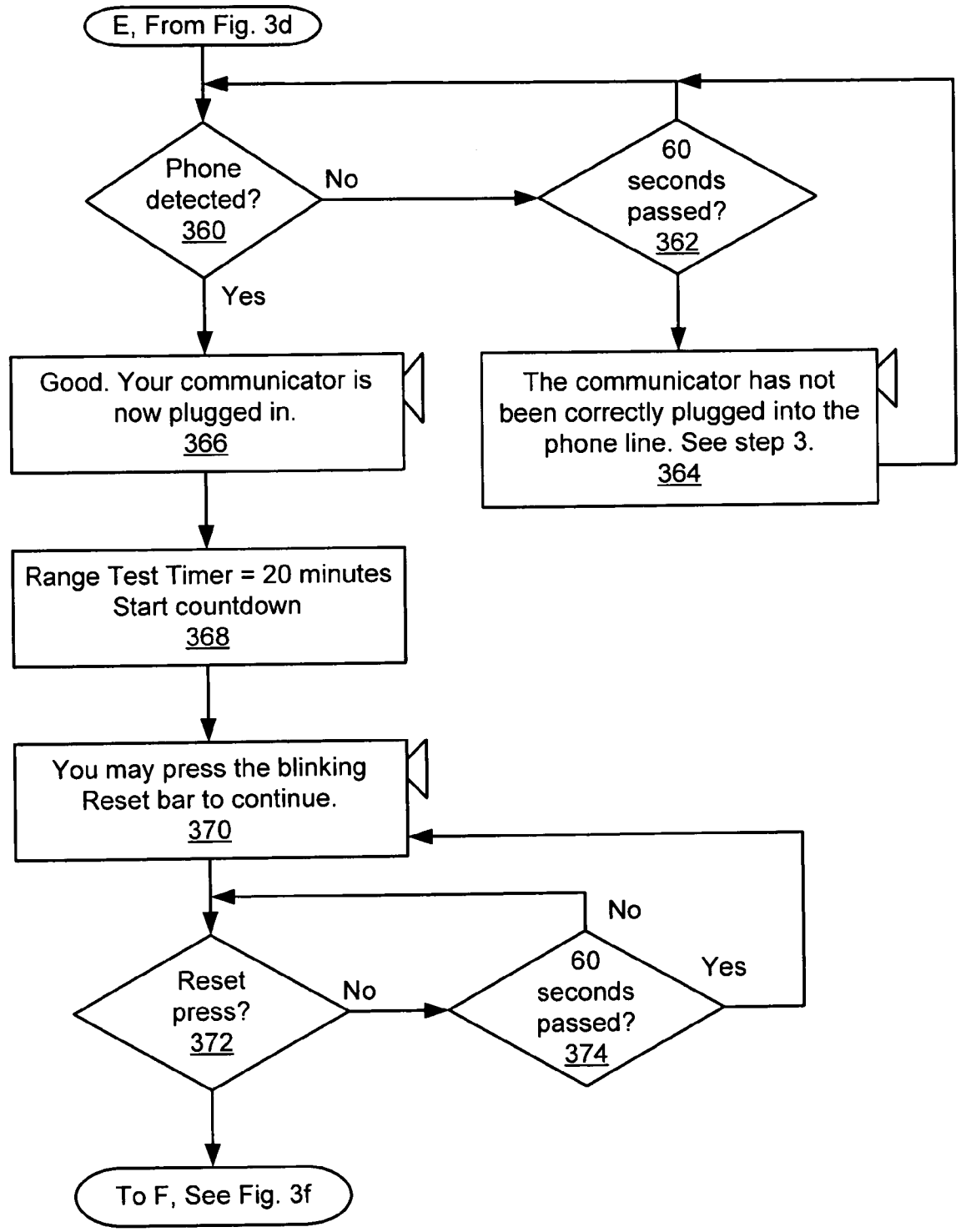
Figure 3F:
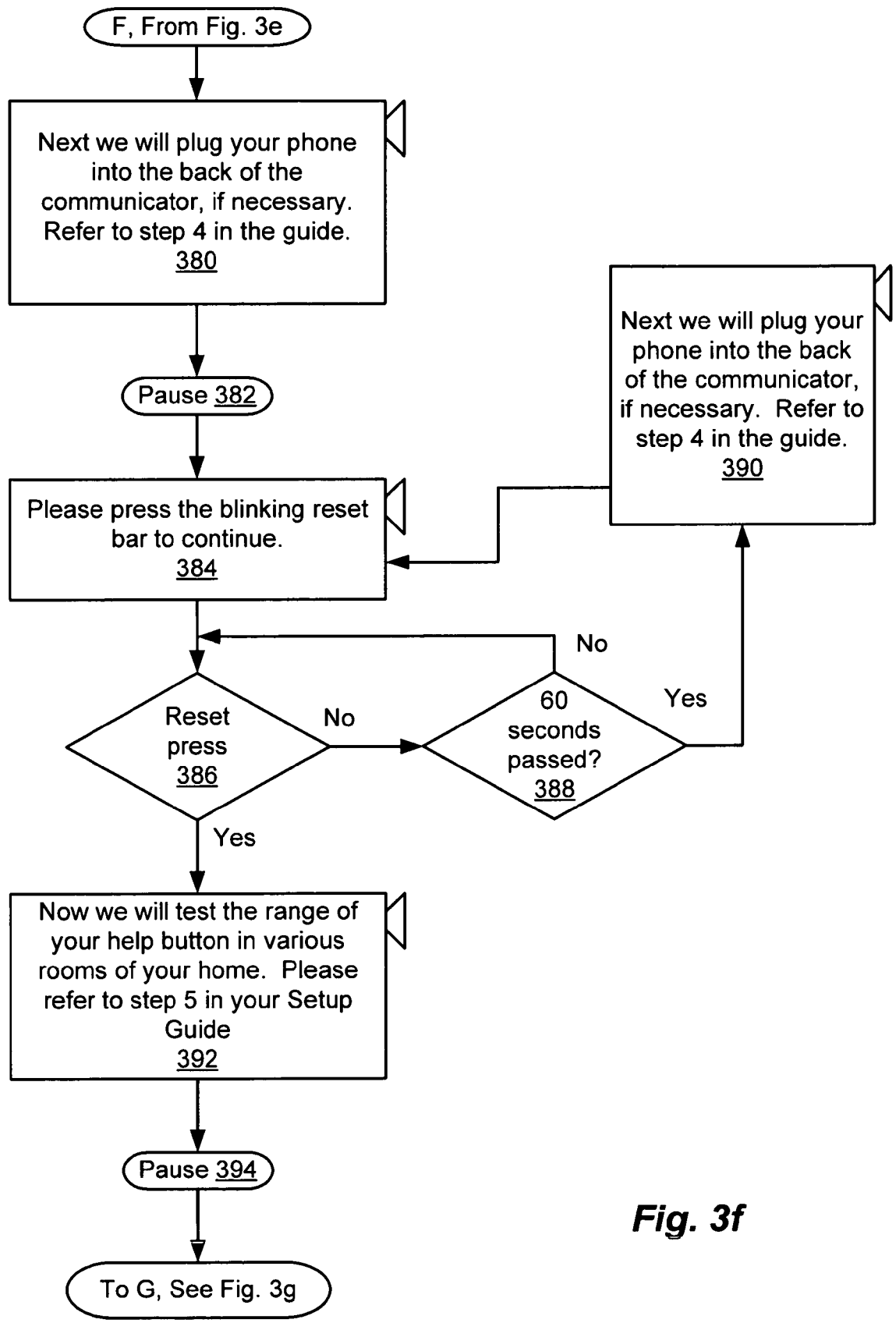
Figure 3G:
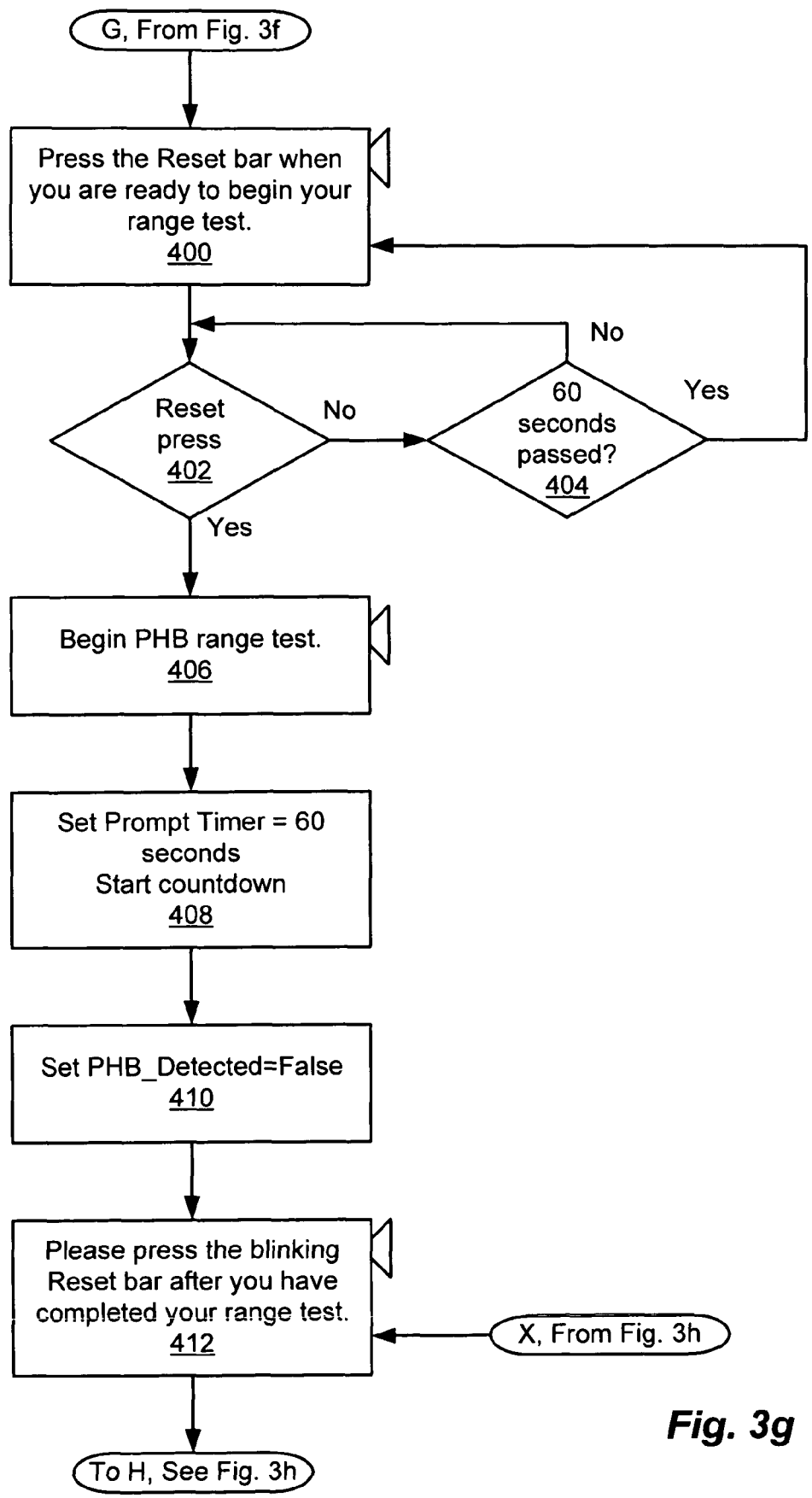
Figure 3H:
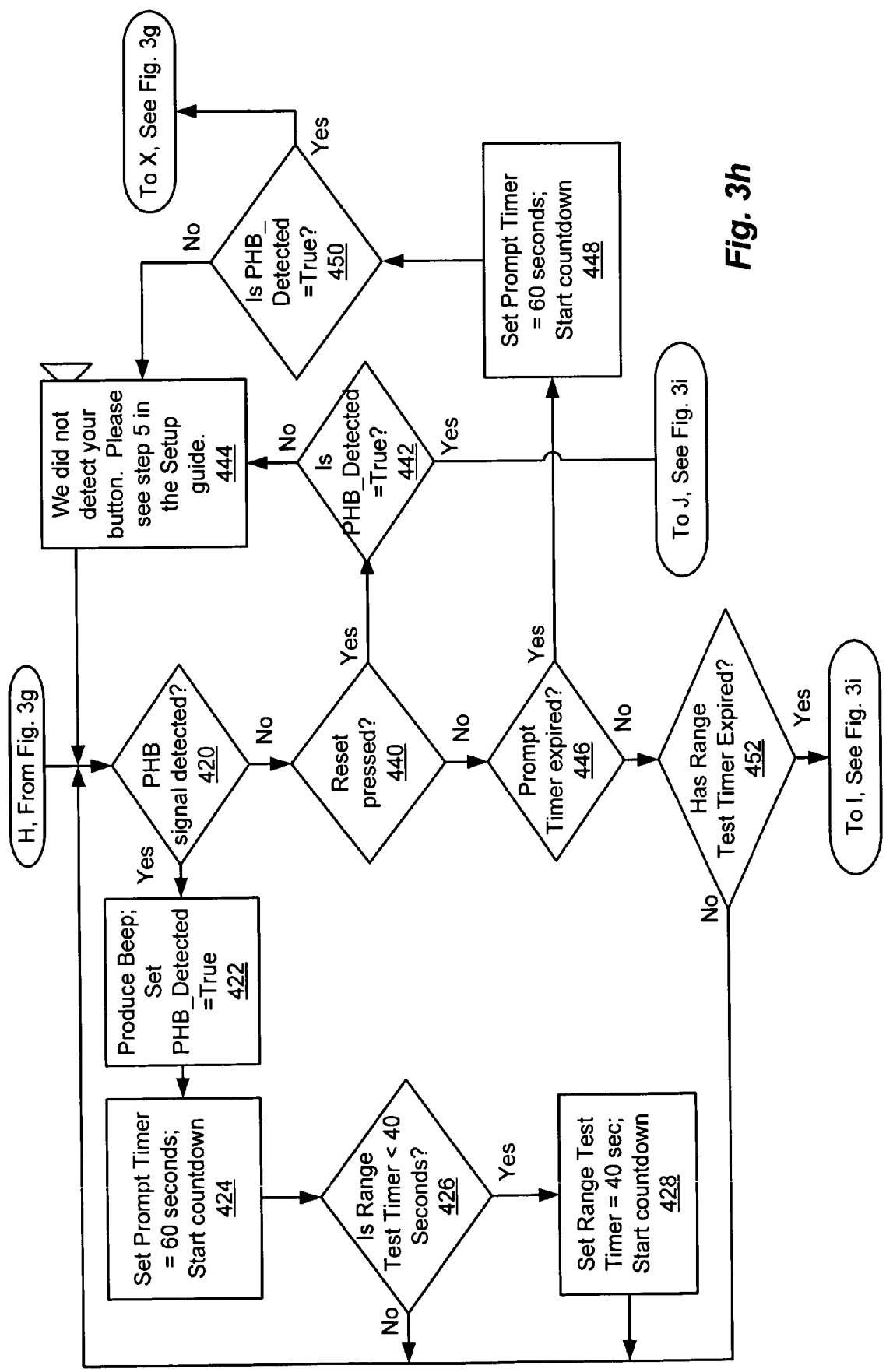

As illustrated in step 412, the speech synthesizer 44 is next controlled by the microcontroller 40 to produce an audible prompt to the subscriber that states "Please press the blinking Reset bar after you have completed your range test." The microcontroller 40 next determines if a signal was received from the PHB transmitter 30 as shown in decision step 420 (See FIG. 3h). If a signal transmitted by the PHB transmitter 30 is received by the communicator 10, the microcontroller 40 produces a beep tone via the speech synthesizer 44 (or via any other suitable tone source) to indicate to the subscriber that the signal from the PHB transmitter 30 was detected by the communicator 10. Thus, feedback is provided to the subscriber to indicate that the signal transmitted by the PHB transmitter 30 was received from the test location at which the PHB transmitter button 32 was pressed. After the communicator 10 produces an audible beep tone as illustrated at step 422, the microcontroller 40 sets the indicator PHB_Detected=True to indicate that at least one range test was successfully performed. The prompt timer is next reset to 60 seconds and the countdown of the prompt timer is started as shown in step 424. The prompt timer is reset to 60 seconds to allow additional time in which to perform a range test before once again being prompted.

The microcontroller 40 next determines if the range test timer that was initially set to 20 minutes has decremented to a time of less than 40 seconds as depicted in step 426. If the range test timer has not decremented to less than 40 seconds, control passes to decision step 420 and the microcontroller 40 again determines if a signal has been received from the PHB transmitter 30. If the microcontroller 40 determines that the range test timer has decremented to less than 40 seconds at decision step 426, the microcontroller 40 resets the range test timer to equal 40 seconds and initiates the countdown of the timer as illustrated in step 428. Following step 428 control passes to decision step 420. By resetting the range test timer in response to receipt of a signal from the PHB transmitter 30 during the installation sequence, the range test period will not time out as long as the subscriber continues to press the PHB transmitter button 32.

If the microcontroller 40 does not detect a signal from the PHB transmitter at step 420, the microcontroller 40 next determines whether the Reset bar 12 has been pressed to determine whether the subscriber desires to end the range test sequence, as illustrated at step 440. If the Reset bar 12 has been pressed, the microcontroller 40 then determines whether the PHB_Detected indicator=True as shown in decision step 442. If PHB_Detected=True, such indicates that at least one range test has been successfully performed. If at least one range test has been successfully performed, control passes to step 462 (see FIG. 3i) and the microcontroller 40 controls the speech synthesizer 44 to produce an audible prompt that states "Thank you. We have now finished setting up your communicator." As illustrated in step 463, the state indicator in the non-volatile memory is set to the INSTALLED state. As shown in step 464, the microcontroller 40 next controls the speech synthesizer 44 to produce an audible prompt that states "Please press the personal help button that you wear to send your first call to the central call station. An associate will welcome you and answer any of your questions." Additionally, if at any time the 20 minute range test timer expires, control passes to step 464 and the subscriber is prompted to press the PHB to send an initial call to the central call station. The microcontroller 40 next determines whether the PHB has been pressed as depicted in step 466.

If, at decision step 442 (See FIG. 3h), the microcontroller 40 determines that PHB_Detected is False, indicating that a signal has not been received from the PHB transmitter 30 during the range test, a prompt is provided to the subscriber that states "We did not detect your button. Please see step 5 in the Setup Guide." as shown at step 444. Control then passes to decision step 420 and the microcontroller 40 determines whether a signal has been received from the PHB transmitter 30.

If the microcontroller 40 determines at decision step 440 that the Reset bar 12 has not been pressed (indicating that the subscriber does not desire to terminate the range test), control passes to decision step 446. The microcontroller 40 then determines whether the prompt timer that was initially set to 60 seconds has expired as illustrated at decision step 446. If the prompt timer has expired, the prompt timer is reset to 60 seconds and the countdown of the prompt timer is restarted as shown at step 448. Next, the microcontroller 40 determines whether a signal has been received from the PHB transmitter 30 during the range test. This is accomplished by testing the indicator PHB_Detected indicator as illustrated in decision step 450. If the PHB_Detected indicator is set to True, such indicates that a signal has been received from the PHB transmitter 30 during the range test. In the event the PHB_Detected indicator is set to True, control passes to step 412 (See FIG. 3g) and a subscriber is prompted to press the blinking Reset bar 12 after the range test has been completed. Following this prompt, control passes again to decision step 420 (See FIG. 3h).

If at decision step 450 the microcontroller 40 determines that a signal has not been received from the PHB transmitter 30 during the range test, the microcontroller 40 controls the speech synthesizer 44 to prompt the subscriber to indicate that a signal from the PHB transmitter 30 has not been detected, as depicted in step 444. Thereafter, control passes to decision step 420 and the microcontroller 40 ascertains whether a signal has been received from the PHB transmitter 30.

If, at decision step 446 it is determined by the microcontroller 40 that the 60 second prompt timer has not expired, the microcontroller 40 then ascertains whether the 20 minute range test timer has expired, as illustrated and step 452. If the range test timer has not expired, control passes to decision step 420 and the microcontroller 40 again determines whether a signal has been received from the PHB transmitter 30.

Figure 3I:
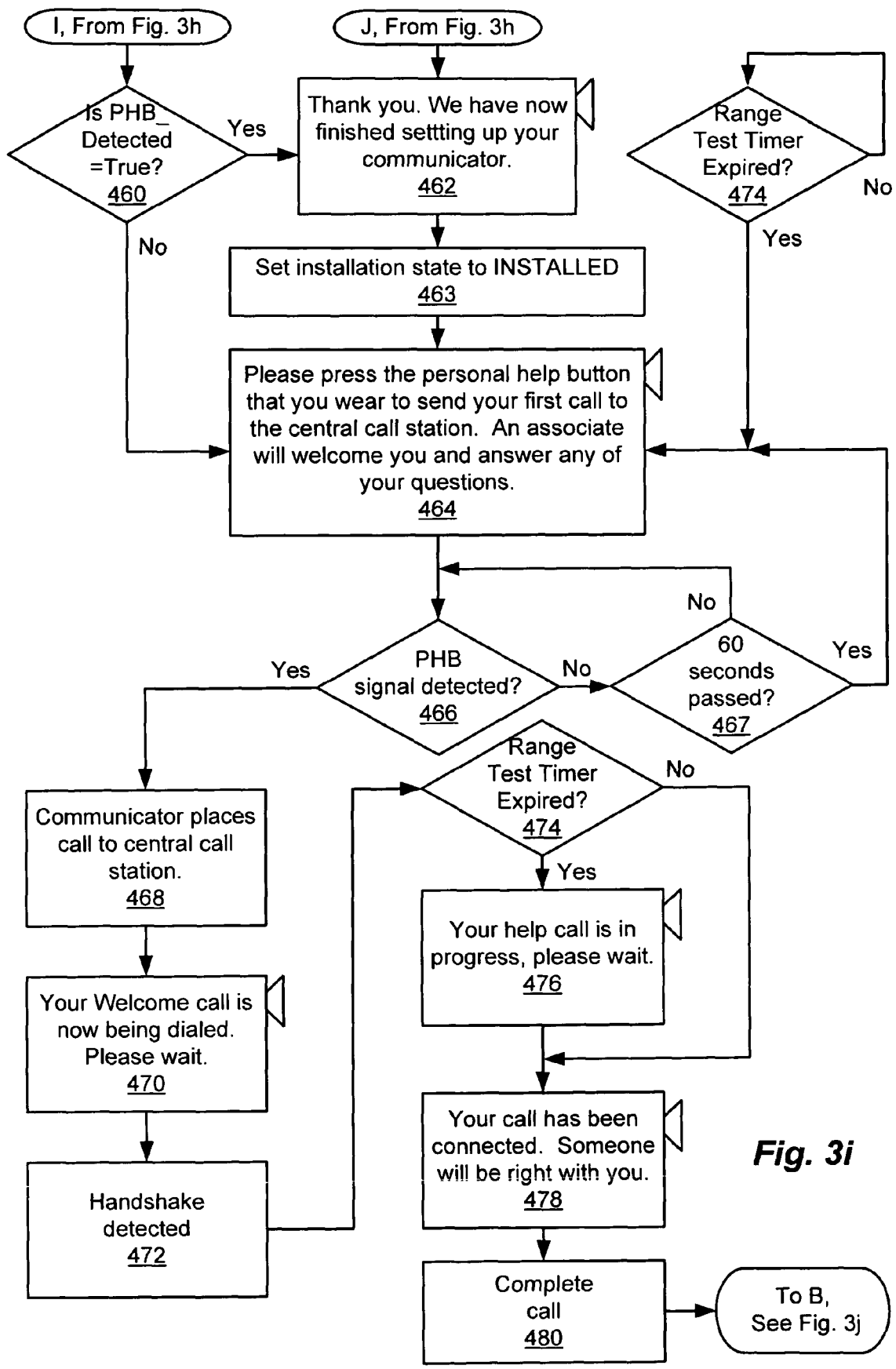
Figure 3J:
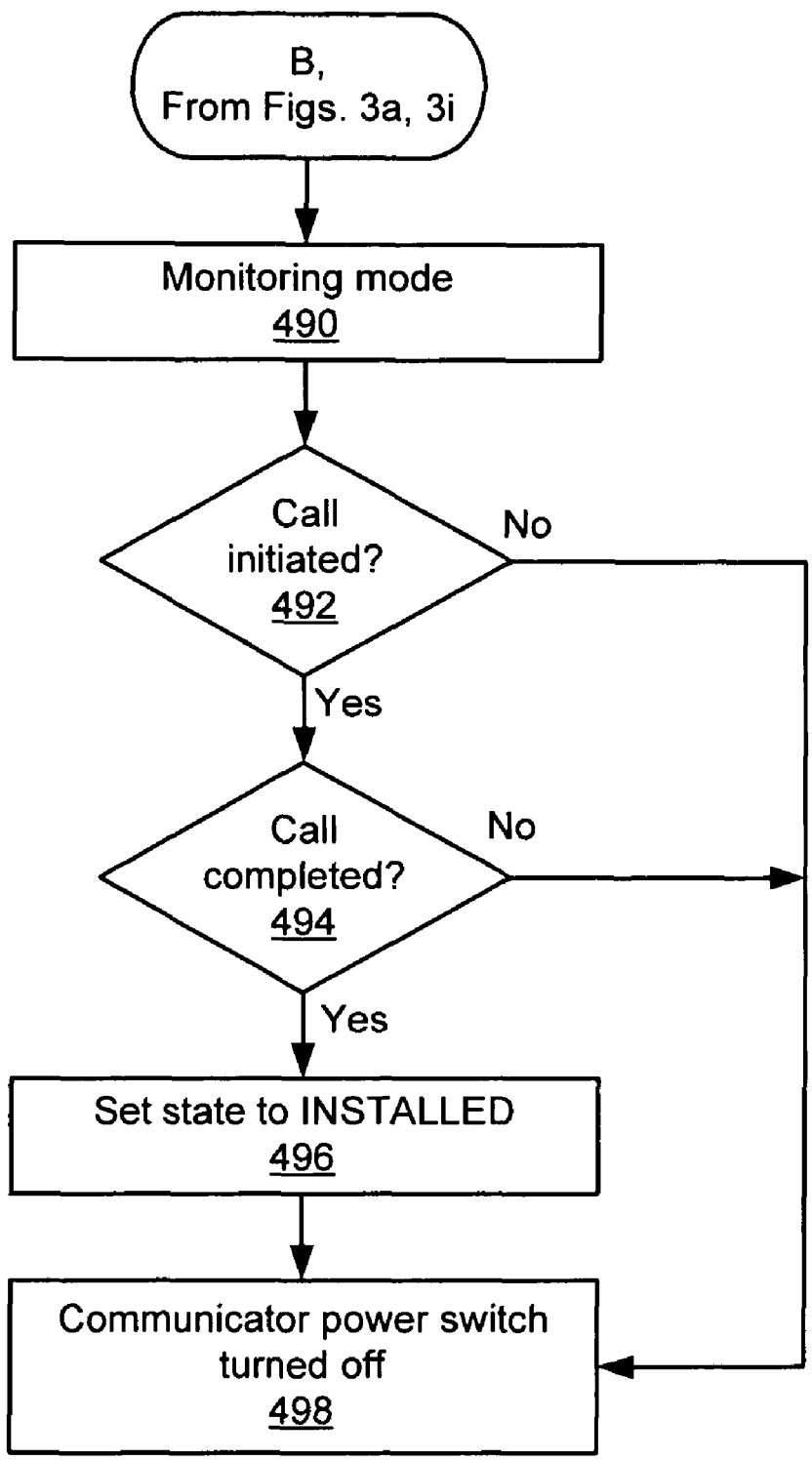

If, in decision step 452, it is determined that the range test timer has expired, the microcontroller 40 determines whether a signal has been received from the PHB transmitter 30 during the range test period by testing the PHB_Detected indicator as depicted at step 460 (See FIG. 3i). If a signal from the PHB transmitter 30 has been detected during the range test period, the microcontroller 40 controls the speech synthesizer 44 to prompt the subscriber that the installation of the communicator 10 has been completed as illustrated at step 462. The microcontroller then executes steps 463, 464 and 466 as previously discussed.

If, at decision step 460, the microcontroller 40 determines that no signal was received from the PHB transmitter 30 during the range test period, upon testing of the PHB_Detected indicator (PHB_Detected=False), the state indicator in the non-volatile memory remains in the NON-INSTALLED state and control passes directly from decision step 460 to step 464. The microcontroller 40 then prompts the subscriber to press the PHB transmitter button 32 to send an initial call to the call center. In this circumstance, the installation sequence has not been successfully completed and the communicator 10 will again proceed through the installation sequence the next time the communicator is powered on after being powered off unless the communicator is controlled to bypass the initialization sequence. Following the audible prompt of step 464, the microcontroller 40 determines whether the PHB transmitter button 32 has been pressed as depicted in decision step 466.

After the subscriber has been prompted to press the PHB transmitter button 32 to initiate the first call to the call center, the microcontroller 40 determines whether the PHB transmitter button 32 has been pressed, as illustrated in decision step 466. In the event the microcontroller 40 determines that the PHB transmitter button 32 has not been pressed for 60 seconds, as illustrated by decision step 467, the microcontroller 40 controls the speech synthesizer 44 to replay the audible prompt as indicated at step 464. In the event the microcontroller 40 determines that the PHB transmitter button 32 has been pressed, the microcontroller 30 initiates a call to the call center by controlling the DTMF circuits 68 to generate the appropriate DTMF tones as depicted at step 468. After initiating the call to the call center, the microcontroller 40 controls the speech synthesizer 44 to generate a further prompt that states "Your Welcome call is now being dialed. Please wait." as illustrated at step 470. The communicator completes handshaking with the call center as depicted in step 472. The microcontroller 10 next determines whether the 20 minute range test timer has expired as illustrated at decision step 474. In the event the range test timer has expired, the microcontroller 40 controls the speech synthesizer 44 to issue a further prompt that states "Your help call is in progress, please wait." as shown at step 476, followed by the further prompt that states "Your call has been connected. Someone will be right with you." as depicted in step 478.

In the event the microcontroller 40 determines in step 474 that the range test timer has not expired, the microcontroller 40 skips the prompt depicted in step 476 and proceeds to control the speech synthesizer 44 to issue the prompt illustrated in step 478. The initial Welcome call is completed as illustrated in step 478 and the communicator 10 enters a monitoring mode as depicted in step 490, in which the microcontroller monitors for alarm conditions.

Once the communicator has commenced monitoring for alarm conditions, in response to detection of a PHB transmitter 30 signal, the communicator initiates a call to the call center. If the microcontroller 40 determines that it has initiated and completed a call as illustrated in decision steps 492, 494, it sets the state indicator to the INSTALLED state as depicted in step 494. Thus, when the communicator is powered up after being powered down it will not proceed through the installation sequence. At some point after the state indicator is set to the INSTALLED state, the communicator 10 will be powered down and the state indicator will remain in the state it was in as of the time the communicator 10 was powered down.

If the microcontroller 40 determines that a call was not initiated in step 492 while in the monitoring mode, when the communicator 10 is powered down, the state indicator will remain in the state as of the time power was switched off as indicated at step 498. Moreover, if a call to the call center is initiated following the commencement of the monitoring mode, but the call is not completed, as indicated at decision step 494, the state indicator will remain unchanged from the time the communicator 10 entered the monitoring mode. Thus, if the communicator 10 was in the INSTALLED state when it entered the monitoring mode, it would remain in the INSTALLED state when the power was switched off if a call had been initiated but not completed. Additionally, if the communicator 10 was in the NON-INSTALLED state at the time it entered the monitoring mode and a call was initiated but not completed, the communicator 10 would remain in the NON-INSTALLED state when the power was switched off.

Referring again to FIG. 3a, if in decision step 252 the microcontroller 40 determines that the Help button 70 was pressed at the time power was switched on, control passes to decision step 260. The microcontroller 40 next ascertains whether the state of the communicator 10 is INSTALLED or NON-INSTALLED. If the state indicator is NON-INSTALLED, the microcontroller 40 bypasses the installation sequence and control passes to the monitoring mode at step 490 (See FIG. 3j). Thus, an installer or subscriber is provided with a mechanism by which to bypass the installation sequence even if the communicator 10 has not successfully completed the installation sequence. If the microcontroller 40 determines that the state indicator is INSTALLED in decision step 260, the microcontroller 40 resets the state indicator to NON-INSTALLED as indicated in step 262 and commences the installation sequence at step 302 (See FIG. 3b). Thus, the ability is provided to reset a communicator 10 from the INSTALLED state to the NON-INSTALLED state to direct the process through the installation sequence even if the communicator 10 had previously assumed the INSTALLED state.

It should be recognized that the specific times set forth for the various timers, and the text for the various audible prompts are intended merely as exemplary times and prompts, and such may be varied without departing from the inventive concepts disclosed herein.

Moreover, while the prompts described herein are described as audible prompts, it should be appreciated that the prompts may be visual prompts, and may comprise messages displayed on a visual display such as an liquid crystal display (LCD) or any other suitable display for visually displaying text messages. Additionally, the prompts may be provided both as visual and audible prompts. Finally, some prompts may be provided as visual prompts while other prompts are provided as audible prompts.

It will further be appreciated that the signal transmitted by the PHB may be an RF signal or an infrared (IR) signal without departing from the inventive concepts disclosed herein recognizing that the receiver 72 must be adapted to receive the signals transmitted by the PHB transmitter 30.

It will further be appreciated by those of ordinary skill in the art that other variations of and modifications to the above described methods and apparatus may be made without departing from the inventive concepts disclosed herein. Accordingly, the invention should not be viewed as limited except by the scope and spirit of the appended claims.

What is claimed is:

1. A method of installing a personal emergency response system that includes a communicator operative in response to activation of a wireless transmitter to initiate a telephone call to a call center, said method comprising the steps of:

detecting a first power switch having on and off positions being switched to the on position;

in response to the detection of said first switch being switched to said on position, in a first determining step, determining whether said communicator has previously successfully completed an installation sequence;

in the event said first determining step indicates that said communicator has not previously successfully completed said installation sequence, performing said installation sequence prior to entering a monitoring mode in which said communicator is operative in response to detection of a transmission from said wireless transmitter to initiate a call to said call center, said performing step including the step of prompting a user to perform a plurality of actions and detecting when as least some of said plurality of actions have been successfully performed;

in the event said first determining step indicates that said communicator has previously successfully completed said installation sequence, bypassing said installation sequence and entering said monitoring mode; and performing a range test sequence, said range test sequence including the steps of:

commencing a range test timer;

prompting the user to activate said wireless transmitter to generate a wireless signal;

detecting whether said wireless signal has been received at said communicator;

in the event said wireless signal has been received:

determining whether a range test timer has decremented such that a time remaining is less than a predetermined value;

in the event said range test timer has decremented such that the time remaining in said range test timer is less than the predetermined value, setting said range test timer to said predetermined value; and in the event said range test timer expires, prompting said user to activate said wireless transmitter to initiate a call from said communicator to said call center.

2. The method of claim 1 wherein said prompting step includes the step of generating a plurality of audible prompts with a speech synthesizer under the control of a processor.

3. The method of claim 1 wherein said prompting step includes the step of generating a plurality of visual prompts on a visual display device.

4. The method of claim 3 wherein said prompting step includes the step of generating a plurality of text based visual prompts on said visual display device.

5. The method of claim 1 wherein said prompting step includes the steps of:

prompting said user to plug an AC power cord into an AC wall outlet and detecting when said AC power cord has been plugged into said AC wall outlet;

prompting said user to plug a phone cord into a phone wall jack and detecting when said phone cord has been plugged into said phone wall jack, and generating an audible prompt employing a speech synthesizer that advises said user that said installation has been completed.

6. The method of claim 5 further including the step of starting the range test timer in response to detecting that both said AC power cord and said phone cord have been connected.

7. The method of claim 1 wherein said prompting step includes the step of activating a visual indictor disposed within a second switch at a time when said user is prompted to press the second switch to continue with the installation sequence.

8. The method of claim 7 wherein said activating step includes the step of turning said visual indicator on and off at a predetermined rate.

9. The method of claim 1 further including the step of storing an indicator in a non-volatile memory, said indicator having a first state in the event said installation sequence has not been previously successfully completed and having a second state in the event said installation sequence has been successfully completed, wherein said step of determining whether said communicator has previously successfully completed said installation sequence includes the step of testing the state of said indicator.

10. The method of claim 9 further including the step of setting said indicator to said first state prior to said detecting step.

11. The method of claim 9 further including the step of setting said indicator to said second state upon successful completion of said installation sequence.

12. The method of claim 9 further including the step of determining whether a first button is activated at the time said first switch is switched to said on position; and at least one of
in the event said first button is activated at the time, said first switch is switched to said on position, and said indicator is in said first state, bypassing said installation sequence and entering said monitoring mode; and
in the event said first button is activated at the time, said first switch is switched to said on position, and said indicator is in said second state, setting said indicator to said first state and performing said installation sequence.

13. A method of installing a personal emergency response system that includes a communicator operative in response to activation of a wireless transmitter to initiate a telephone call to a call center, said method comprising:
storing an indicator in a non-volatile memory, said indicator having a first state in the event an installation sequence has not been previously successfully completed and having a second state in the event said installation sequence has been successfully completed;
determining whether a first button is activated at the time a first power switch is switched to an on position;
in the event said first button is activated at the time said first switch is switched to said on position and said indicator is in said second state, setting said indicator to said first state and performing said installation sequence,
performing the installation sequence including:
(a) prompting said user to perform range testing of said wireless transmitter, said range test sequence including the steps of:
commencing a range test timer,
prompting the user to activate said wireless transmitter to generate a wireless signal, and
detecting whether said wireless signal has been received at said communicator; and
(b) generating a plurality of audible prompts with a speech synthesizer under the control of a processor;
in the event said first button is activated at the time said first switch is switched to said on position and said indicator is in said first state, bypassing said installation sequence and entering said monitoring mode in which said communicator is operative in response to detection of a transmission from said wireless transmitter to initiate a call to said call center.

14. The method of claim 13 wherein said performing step includes the step of prompting a user to perform a plurality of actions and detecting when as least some of said plurality of actions have been successfully performed.

15. The method of claim 13 wherein said prompting step includes the step of prompting said user to plug an AC power cord into an AC wall outlet and detecting when said AC power cord has been plugged into said AC wall outlet.

16. The method of claim 13 wherein said prompting step includes the step of prompting said user to plug a phone cord into a phone wall jack and detecting when said phone cord has been plugged into said phone wall jack.

17. A communicator to use in a personal emergency response system, said communicator operative in response to receipt of a wireless signal from a wireless transmitter to initiate a telephone call to a call center, said communicator comprising:
a first switch on at least some power to said communicator, said first switch having an off position and an on position;
a processor operative to execute a software program, said software program operative to:
a. determine whether a predetermined installation sequence has been previously successfully completed in response to switching said first switch from said off position to said on position,
b. bypass said predetermined installation sequence in the event said processor finds as a result of said determination that said installation sequence has been successfully completed,
c. perform said predetermined installation sequence in the event said processor determines that said installation sequence has not been successfully completed,
d. provide an indication that said installation sequence has been successfully completed in response to the successful completion of said sequence, and
e. repeat steps a through d at least some of the times when said first switch is switched to said on position from said off position;
a prompting apparatus which prompts a user to perform at least one specified action during an installation sequence in response to at least one control signal issued by said processor;
circuitry in communication with said processor for detecting when said at least one specified action has been performed by said user;
said processor being operative to perform a predetermined range test sequence including:
starting a range test timer;
prompting said user to activate said wireless transmitter to generate a wireless signal;
detecting whether said wireless signal has been received at said communicator; and
in the event said wireless signal has been detected:
determining whether said range test timer has decremented to a value less than a predetermined value corresponding to a time less than a predetermined time;
in the event said range test timer has decremented to said value less than said predetermined value, setting said range test timer to said predetermined value; and
in the event said range test timer expires, controlling said prompting apparatus to prompt said user to activate said wireless transmitter to initiate a call from said communicator to said call center.

18. The communicator of claim 17 wherein said apparatus which prompts said user to perform said at least one specified action comprises:
a speech synthesizer operative to produce at least one predetermined audio prompt in response to at least one command issued by said processor.

19. The communicator of claim 18 wherein said speech synthesizer prompts said user to plug an AC power cord into an AC wall outlet; and said detecting circuitry includes circuitry in communication with said processor to detect when said AC power cord has been plugged into said AC wall outlet.

20. The communicator of claim 19 wherein said prompting apparatus includes:
apparatus which prompts said user to plug a phone cord into a phone wall jack and said detecting circuitry includes circuitry which detects when said phone cord has been plugged into said phone wall jack.

21. The communicator of claim 20 wherein the range test timer is started in response to detecting that both said AC power cord and said phone cord have been plugged into the outlet and jack, respectively.

22. The communicator of claim 17 wherein said prompting apparatus includes:
a visual display device operative to produce at least one visual prompt to said user.

23. The communicator of claim 22 wherein said visual display device is operative in response to said at least one control signal to display at least one text message to said user.

24. The communicator of claim 17 further including:
an actuator for a second switch; and
a visual annunciator mounted within said actuator; and
said processor being operative to activate said visual annunciator mounted within said actuator at a time when said processor is controlling said prompting apparatus to indicate the actuator should be pressed to continue the installation sequence.

25. The communicator of claim 24 wherein said processor is operative to cause said visual annunciator to blink at a predetermined rate.

26. A communicator to use in a personal emergency response system, said communicator operative in response to receipt of a wireless signal from a wireless transmitter to initiate a telephone call to a call center, said communicator comprising:
a first switch for switching on at least some power to said communicator, said first switch having an off position and an on position;
a processor operative to execute a predetermined installation sequence;
a non-volatile memory containing a state indicator, said state indicator being of a first state when a predetermined installation sequence has not been previously successfully completed and being of a second state when said predetermined installation sequence has been successfully completed;
a first button having an activated state and a non-activated state, said processor being operative to determine whether said first button is in said activated state at a time when said first switch is switched from said off position to said on position, and at least one of:
in response to determining that said first button is in said activated state at a time when said first switch is switched from said off position to said on position when said state indicator is in said first state, to bypass said predetermined installation sequence and enter a monitoring mode in which said processor is operative to initiate a call to said call center in response to detection of an alarm condition, or
in response to determining that said first button is in said activated state at a time when said first switch is switched from said off position to said on position when said state indicator is in said second state, to reset said state indicator to said first state and to perform said predetermined installation sequence.

27. The communicator of claim 26 further including:
a prompting apparatus which prompts a user to perform at least one specified action during said installation sequence in response to at least one control signal issued by said processor and circuitry in communication with said processor for detecting when said at least one specified action has been performed by said user.

28. A communicator to use in a personal emergency response system, said communicator operative in response to receipt of a wireless signal from a wireless transmitter to initiate a telephone call to a call center, said communicator comprising:
a first switch switching on at least some power to said communicator, said first switch having an off position and an on position;
a first button having an activated state and a non-activated state;
a processor operative to determine whether said first button is in said activated state or said non-activated state when said first switch is switched from said off position to said on position, said processor being operative:
in response to determining that said first button is in said activated state when said first switch is switched from said off position to said on position and that a predetermined installation sequence has not been completed, to perform said predetermined installation sequence, and
in response determining that said first button is in said activated state when said first switch is switched from said off position to said on position when said predetermined installation sequence has been completed, to bypass said predetermined installation sequence and enter a monitoring mode in which said processor is operative to initiate a call to said call center in response to detection of an alarm condition.

29. The communicator of claim 28 wherein said prompting apparatus includes:
apparatus which prompts a user to plug an AC power cord into an AC wall outlet and prompts said user to plug a phone cord into a phone wall jack;
circuitry which detects when said AC power cord has been plugged into said AC wall outlet and detects when said phone cord has been plugged into said phone wall jack; and
a speech synthesizer which generates an audible prompt that advises said user that said installation has been completed in response to detecting that both said AC power cord and said phone cord have been plugged into the outlet and jack, respectively.

30. The communicator of claim 28 further including:
a non-volatile memory containing a state indicator, said state indicator being of:
a first state when said predetermined installation sequence has not been previously successfully completed, and
a second state when said predetermined installation sequence has been successfully completed; and
said processor being operative to determine whether said predetermined installation sequence has been previously successfully completed by testing the state of said state indicator.

31. The communicator of claim 30 wherein said processor is operative to set said indictor to said second state upon the successful completion of at least a first portion of said predetermined installation sequence.

32. A communicator to use in a personal emergency response system, said communicator operative in response to receipt of a wireless signal from a wireless transmitter to initiate a telephone call to a call center, said communicator comprising:
- a first switch switching on at least some power to said communicator, said first switch having an off position and an on position;
- a non-volatile memory containing a state indicator, said state indicator indicating:
  - a first state when a predetermined installation sequence has not been previously successfully completed, and
  - a second state when said predetermined installation sequence has been successfully completed;
  - whether said predetermined installation sequence has been previously successfully completed being determinable by testing the state of said state indicator;
- a processor operative to:
  - a. in response to the first switch being switched from the off position to the on position, determining whether the state indicator is in the first state or the second state;
  - b. in response to determining that the state indicator is in the first state, performing the predetermined installation sequence;
  - c. in response to completing the predetermined installation sequence, switching the state indicator to the second state; and
  - d. in response to determining that the state indicator is in the second state, bypass the installation sequence and enter a monitoring mode in which said processor is operative to initiate a call to the call center in response to detection of an alarm condition
  - e. repeat steps a through d at least some of the times when said first switch is switched to said on position from said off position.

33. The communicator of claim 32 further including:
- a power cord having a power plug configured to be plugged into a wall outlet to provide power to the communicator;
- a phone cord having a phone plug configured to be plugged into a phone jack to connect the communicator with a phone system;
- a circuit which detects when each of the power plug has been plugged into the outlet and the phone plug is plugged into the phone jack;
- said processor being operative to control a speech synthesizer to prompt a user:
  - in response to switching the first switch on, to plug one of the power plug into the wall outlet and the phone plug into the phone jack,
  - in response to the circuit detecting that power plug and the phone jack has been plugged in to plug the other of the power plug and the phone plug in,
  - in response to the circuit detecting that both the power plug and the phone plug have been plugged in, to perform range testing of said wireless transmitter during said predetermined installation sequence.

* * * * *